United States Patent [19]  
Jacobs

[11] 3,871,805  
[45] Mar. 18, 1975

[54] RECIPROCATING SCREW INJECTION MOLDING MACHINE CYLINDER HEAD WITH INTEGRAL SPREADER AND AUTOMATIC NOZZLE

[76] Inventor: Arthur W. Jacobs, 5994 Columbus Rd., North Olmsted, Ohio 44070

[22] Filed: Apr. 26, 1973

[21] Appl. No.: 354,655

[52] U.S. Cl................ 425/245 NS, 425/DIG. 224, 425/DIG. 225
[51] Int. Cl.............................................. B29f 1/03
[58] Field of Search. 425/245 NS, 245 R, DIG. 224, 425/DIG. 225, 159, 146, 147, 244; 222/494, 496; 259/191, 192, 193; 137/509, 536

[56] References Cited
UNITED STATES PATENTS

| | | | |
|---|---|---|---|
| 2,359,840 | 10/1944 | Goessling | 425/146 |
| 2,585,112 | 2/1952 | Gravesen | 425/245 X |
| 3,295,169 | 1/1967 | Moslo | 425/245 NS X |
| 3,510,915 | 5/1970 | Johansson | 425/245 X |
| 3,671,162 | 6/1972 | Lohmann | 425/245 |

FOREIGN PATENTS OR APPLICATIONS

| | | | |
|---|---|---|---|
| 498,653 | 1/1939 | United Kingdom | 425/245 NS |

Primary Examiner—Andrew R. Juhasz
Assistant Examiner—David B. Smith
Attorney, Agent, or Firm—Donnelly, Maky, Renner & Otto

[57] ABSTRACT

A cylinder head for a reciprocating screw injection molding machine characterized in that it has an integral spreader which transforms a solid cylindrical body of plasticized material into a plurality of streams of progressively decreasing cross-section area which converge to the nozzle orifice, said spreader being hollow and containing a spring which biases a pressure-actuated valve member into engagement with a valve seat around the nozzle orifice located close to the tip of the nozzle whereby, after a short delay following the filling of the mold with plasticized material by stroking of the screw in the injection cylinder, the material freezes in the nozzle orifice so as to constitute a short length and small diameter extension of the mold sprue which is withdrawn from the nozzle orifice when the cylinder and nozzle are retracted away from the mold. The interior of the spreader is communicated with the atmosphere whereby the valve member is automatically opened at desired pressure of the plasticized material acting thereon when the screw is operated as a plunger to inject plastic material into the mold contacted by the nozzle and is automatically closed upon decrease in actuating force on the screw (and resulting decompression of the material in the cylinder) after the mold is filled with plastic material, said valve member remaining in closed position when the nozzle is out of engagement with the mold and during rotation and retraction of the screw.

9 Claims, 6 Drawing Figures

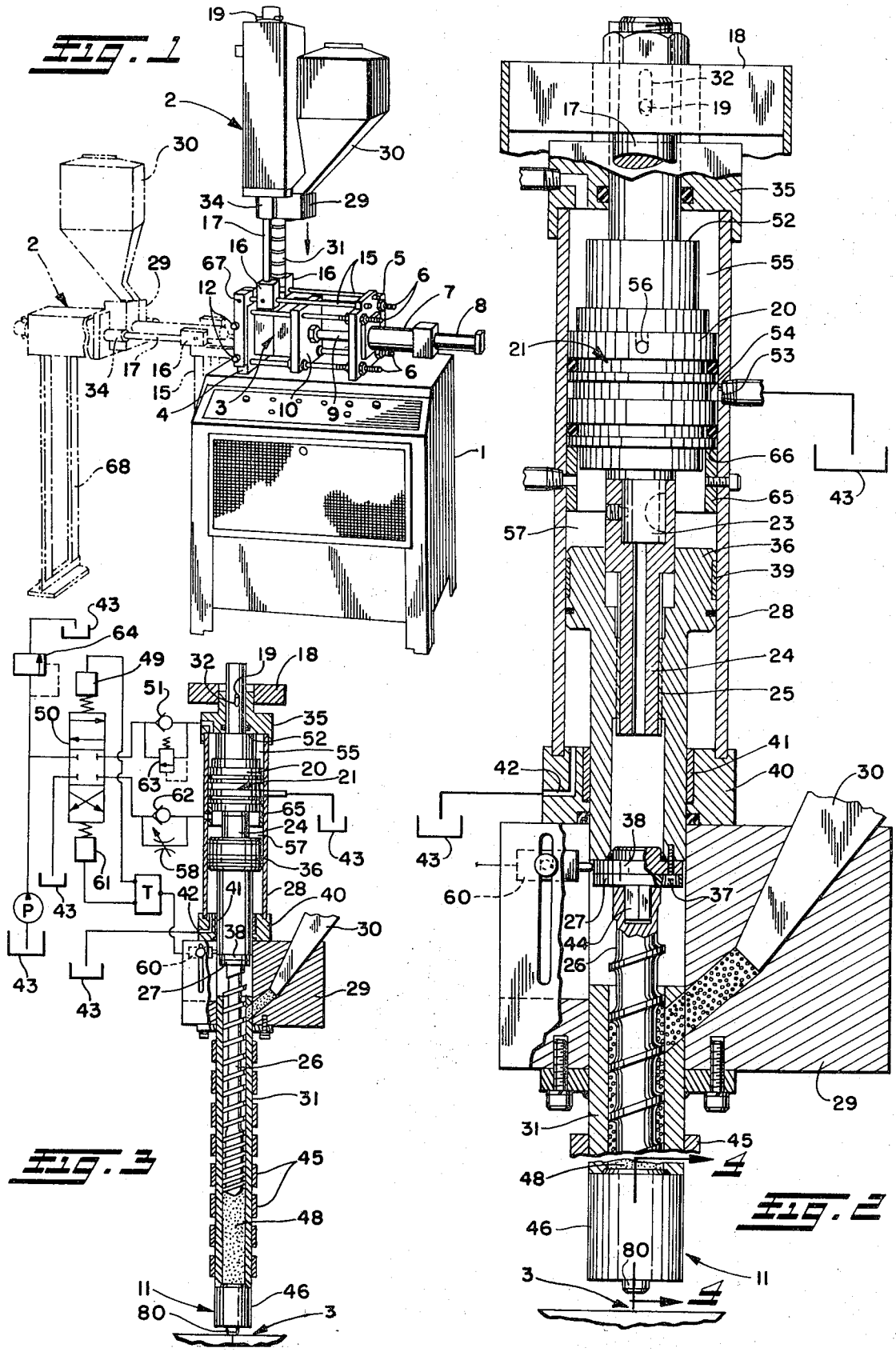

RECIPROCATING SCREW INJECTION MOLDING MACHINE CYLINDER HEAD WITH INTEGRAL SPREADER AND AUTOMATIC NOZZLE

CROSS REFERENCE TO RELATED APPLICATION

Insofar as the reciprocating screw injection molding machine is concerned reference may be had to the copending application of Arthur W. Jacobs Ser. No. 289,436, filed Sept. 15, 1972, now U.S. Pat. No. 3,810,728.

BACKGROUND OF THE INVENTION

Reciprocating screw injection molding machines are well known in the art and in some of them there is provision for melt decompression effected by movement of the screw a short distance away from the nozzle after the rotation of the screw has been discontinued by means of a preset limit switch or by means of a timer, the resulting decrease in pressure on the plasticized material serving to prevent leakage or drooling thereof through the nozzle until injection is required. When the mold is in closed position the actuation of the screw causes the cylinder and screw to move forward to engage the nozzle with the mold whereupon continued stroking of the screw injects the plasticized material into the mold.

It is also known in the art to provide a shut off valve between the cylinder and the nozzle to permit plasticizing of material while the mold is open thereby to prevent the melted material from drooling into the mold. Such valves are generally of the positive acting type i.e. rotary plug valves, slide valves, etc. requiring actuating mechanism therefor and in some cases the nozzle itself has sliding sealed engagement with the mold thus requiring mechanism for laterally actuating the nozzle and cylinder to move the nozzle orifice and mold sprue into and out of register. When a positive acting type of valve is employed and wherein the nozzle has firm sliding sealed engagement with the mold it is necessary to provide a heating band around the nozzle to prevent freeze up of the plasticized material in the nozzle orifice. Moreover, the positive acting type of valve has a valve seat located a substantial distance from the end of the nozzle tip whereby a heating band is necessary to prevent freeze up of material in the plug valve or slide valve passage and in the nozzle orifice. In some cases the nozzle itself constitutes a spring and pressure closed valve member (see for example the aforesaid Jacobs application Ser. No. 289,436) wherein the nozzle tip is first engaged with the mold and, as the cylinder moves with respect to the nozzle and mold, the nozzle orifice is thereby opened to permit flow of plasticized material through the nozzle orifice.

SUMMARY OF THE INVENTION

In contradistinction to the above referred to known types of reciprocating screw injection molding machines the present machine has a simple one piece cylinder head which has an integral spreader or torpedo for transforming the cylindrical body of plasticized material into streams of progressively decreasing cross-section area which converge to the nozzle orifice contained in a nozzle having screw threaded engagement with the cylinder heat. The cylinder head herein is further characterized in that the spreader is hollow and slidably receives therein a pressure actuated valve member which is biased to nozzle orifice closing position by a spring inside the spreader.

It is another object of this invention to provide a nozzle orifice valve seat which is located close to the tip of the nozzle so that after filling of the mold, the material in the short length and small diameter nozzle orifice will solidify so as to constitute an extension of the mold sprue which will be pulled out of the nozzle orifice when the nozzle is retracted out of engagement with the mold.

It is another object of this invention to provide a nozzle orifice seat which has radial float in the nozzle to provide for fluid tight seating of the valve member despite eccentricity of the threads in the cylinder head into which the nozzle is screwed.

Other objects and advantages will appear in the ensuing description.

BRIEF DESCRIPTION OF THE DRAWING

FIG. 1 is a perspective view of a machine embodying the present invention;

FIG. 2 is a central vertical cross-section view of the injection assembly;

FIG. 3 is a cross-section view similar to FIG. 2 except showing a preferred form of control circuit to obtain automatic cycling of the machine;

DETAILED DESCRIPTION OF THE INVENTION

Figure 4:
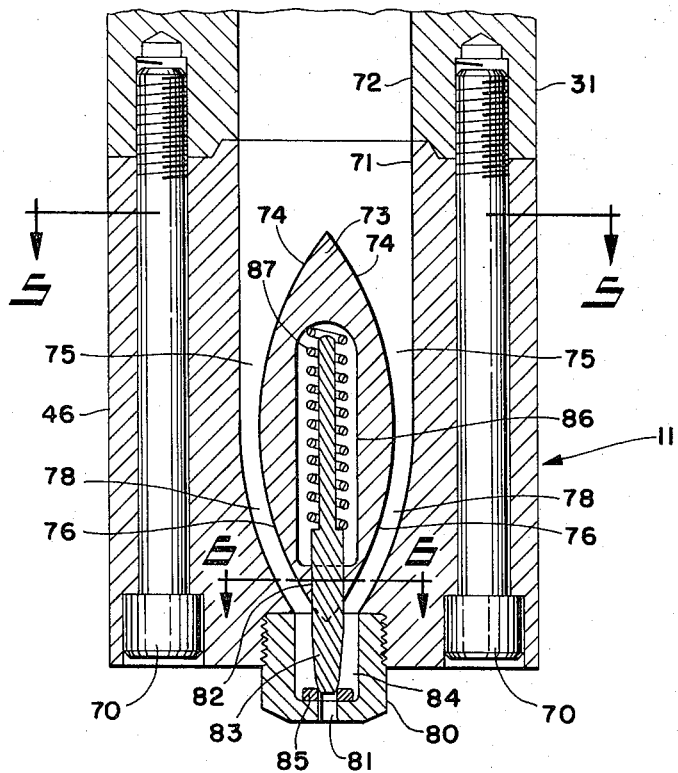
FIG. 4 is a cross-section view on enlarged scale taken substantially along the line 4—4, FIG. 2.

The injection molding machine herein as shown in FIG. 1, comprises a base cabinet 1 within which is housed hydraulic control equipment for actuating the injection assembly 2 and for opening and closing the mold 3.

On the top of the base cabinet 1 are mounted fixed platens 4 and 5 joined together by tie rods 6, the platen 4 having secured thereto one part of the mold 3, and the platen 5 having secured thereto a mold clamp cylinder 7 and a clamp pressure intensifying cylinder 8, the piston rod 9 of the clamp cylinder 7 being secured to a movable platen 10 which carries the other part of the mold 3 and which is guided on the tie rods 6 for movement toward and away from the fixed platen 4 and the mold part secured thereto. When the aforesaid parts of said mold 3 are in mating engagement they define therebetween a mold cavity into which plasticized material is injected from the injection assembly 2 which is FIG. 1 is shown mounted in a vertical position with the nozzle 11 valve and spreader assembly 11 in register with a mold sprue at the parting line between the parts of mold 3.

The fixed platen 4 has secured on opposite sides thereof by the screws 12 a pair of L-shaped links 14 which have portions extending toward each other above the upper tie rods 6 and extending from said links 14 through holes in the other fixed platen 5 are injection assembly support bars 15 on which the blocks 16 are adjustably secured to effect alignment of the nozzle 11 with the sprue of mold 3. Extending upwardly from said blocks 16 are guide rods 17 which are connected together at their upper ends by a crosshead 18. Fixedly secured to the crosshead 18 as by means of the cross pin 19 is the shaft portion of a housing 20 of a feed screw drive motor 21, and the rotor shaft 23 of said motor 21 is secured to a male spline member 24 which is axially slidably keyed in a female spline 25 in piston 36, the latter being in axial thrust and rotary driving engagement with the upper end of the feed screw 26 through drive member 27 as will presently be described.

The entire actuator cylinder 28, feed box 29 and hopper 30, and heating cylinder 31 assembly is mounted for vertical movement as permitted by the slot 32 through which the pin 19 passes and said assembly is guided on the vertical bars 17 as by means of bearings 34 provided on the feed box 29. Guiding also occurs at the upper end whereat the shaft portion of the actuating cylinder head 35 is vertically movable on the shaft portion of the motor housing 20 and in the crosshead 18.

Reciprocable and rotatable in the lower end of the actuating cylinder 28 is the piston 36 which has clamped to its lower end by the screws 37 a closure plate 38. The piston 36 has molded therein a nylon or like bearing ring 39 and may be provided with a suitable packing ring as shown. Adjacent the lower end of the actuating cylinder 38 is a cylinder head 40 with a bronze bearing 41 therein, said head 40 having a drain passage 42 communicated with the reservoir 43 so that hydraulic oil which may leak past the piston 36 will be effective to lubricate the bearing 41.

The feed screw 26 has axial thrust and rotary driving engagement with the piston 36 through the drive member 27, the latter having a square portion 44 fitting in a square recess in the upper end of said feed screw 26 and tapered holes loosely fitting over the tapered heads of the screws 37.

The heating cylinder 31 is of familiar form having electric heating bands 45 therearound and the lower end thereof has a nozzle valve and spreader assembly 11 which constitutes, as described in detail with reference to FIGS. 4 to 6, a heating cylinder head 46 having an automatic valve assembly which is closed when the injection assembly 2 is in its elevated position as shown in FIG. 2 with the tip of the nozzle and spreader assembly 11 out of engagement with the mold 3. By reason of such upward movement of the injection assembly 2, no heating band 45 is required around the assembly 11 since it is not in heat conducting relation to the mold 3 and hence the plastic material will not freeze in the nozzle assembly 11 except as hereinafter discussed in detail even in the absence of such heater band 45 therearound.

When the feed screw 26 is at the lower end of its stroke in the heating cylinder 31 with plasticized material in the collecting chamber 48 having been injected through the open nozzle assembly 11 into the mold 3, the closing of switch contacts in the timer T energizes the upper solenoid 49 of the four way valve 50 to conduct fluid under pressure from the pump P to the upper end of the actuating cylinder 28 via the check valve 51. At that time the injection assembly is in its down position with its upper cylinder head 35 in close proximity to the shoulder 52 on the motor housing 20 and in that position the outlet opening 53 in the actuating cylinder 28 is out of register with the motor outlet port 54 and hence pressure will build up in the chamber 55 to lift the entire injection assembly 2 to disengage the closed nozzle valve and spreader assembly 11 from the mold 3. When the injection assembly is thus lifted, the outlet port 53 in the cylinder 28 registers with the outlet port 54 of the motor housing 20 whereupon oil will flow from the chamber 55 into the motor 21 through the inlet port 56 to effect turning of the rotor shaft 23 and feed screw 26. As the feed screw 26 rotates the pellets or chips of plastic material are deposited around the hub of the screw 26 and are advanced downwardly and worked and melted and deposited in the collecting chamber 48 at the lower end of the heating cylinder 31. Back pressure on the plasticized material in collecting chamber 48 is exerted by throttling the exhaust from the cylinder chamber 57 through an adjustable restrictor 58 through which the displaced oil passes to the reservoir 43 via the four way valve 50. Accordingly, as the screw 26 rotates it moves upwardly under the resistance of the adjustable restrictor 58 thus to apply desired pressure on the plasticized material as it collects in the collecting chamber 48.

When there is sufficient plasticized material in the collecting chamber 48 to fill the mold 3 the switch 60 is closed to energize timer T to close contacts therein to energize the lower solenoid 61 to communicate the pump P delivery line with the injection chamber 57 via valve 50 and the check valve 62, and to communicate the motor chamber 55 with the reservoir 43 via the counterbalance valve 63 and valve 50, the counterbalance valve 63 being normally closed thus to prevent downward drifting of the injection assembly 2. As now apparent, fluid under pressure in the injection chamber 57 will tend to move the piston 36 and feed screw 26 downwardly and since the nozzle valve assembly 11 is in closed position, the plasticized material in the collecting chamber 48 will urge the injection assembly 2 downwardly until the upper head 35 is in close proximity to the shoulder 52 and at that time the tip of the nozzle assembly 11 contacts the mold 3 whereby the nozzle valve assembly 11 is opened as hereinafter described and retained against the mold 3. Such downward movement of the injection assembly 2 will build up pressure in the motor chamber 55 sufficient to open the counterbalance valve 63 for flow of oil from the chamber 55 to the reservoir 43 via the counterbalance valve 63 and four way valve 50. As aforesaid, when the injection assembly 2 is in its lowered position with the nozzle valve assembly 11 open and engaged with the mold 3, the outlet ports 53, 54 are out of registry.

The piston 35 then continues its downward movement to inject the plasticized material in the collecting chamber 48 through the open nozzle valve assembly 11 into the mold 3. After the plasticized material has been injected into the mold 3 under a pressure as determined by the adjustable relief valve 64 and after it solidifies therein as determined by the setting of timer T, the clamp cylinder 7 may be actuated by valve means (not shown) to move the movable platen 10 and mold section carried thereby away from the fixed mold section on platen 4, and, as well knon in the art, suitable ejecting mechanism may be provided to eject the molded article from the open mold 3. When the timer T cycle runs out, it opens the contacts for solenoid 61 and closes the contacts for the upper solenoid 49 to repeat the automatic operation of the machine with oil being admitted into the motor chamber 55 through the four way valve 50 and check valve 51, again to raise the injection assembly 2 until the outlet ports 53 and 54 are in register and the stop ring 65 engages the stop shoulder 66 and at that time the rotation of the feed screw 26 commences with upward movement of the feed screw 26 and piston 36 under a predetermined back pressure as determined by the adjustable restrictor 58.

In the injection molding machine herein, the injection assembly 2 including the actuating cylinder 28, the feed box 29 and hopper 30, and the heating cylinder 31 may be optionally mounted in a horizontal position as shown in phantom lines in FIG. 1. In order to convert the machine from a vertical machine to a horizontal machine, the upper screws 12 which secure the links 14 to the fixed platen 4 may be removed and the links 14 and bars 15 swung to a vertical position. The bars 15 are adjusted downwardly with the blocks 16 being mounted on the upper ends of said bars 15. The injection assembly 2, when mounted in a horizontal position has its nozzle valve assembly 11 aligned with a central sprue in the mold part which is secured to the platen 4 by adjusting the blocks 16 upwardly or downwardly with respect to the bars 15, the bars 15 being adjustably secured as by screws 67 to the respective links 14. For such horizontal mounting, the feed box 29 is provided with a feed opening for mounting the feed hopper 30 as shown in phantom lines in FIG. 1. To minimize bending strain on the guide rods 17 as caused by the weight of the injection assembly 2, a stand 68 is desirably provided.

In case it is desired to provide both a horizontal and a vertical injection assembly 2 as for two-color sequential injection, the horizontal cylinder assembly may be mounted as shown in phantom lines in FIG. 1, but in that case since the bars 15 are not present, the blocks 16 for the vertical assembly 2 may be modified to be secured on the upper tie rods 6, again the blocks 16 being adjustable along the upper tie rods 6 to align the nozzle valve assembly 11 with the mold 3.

Figure 5:
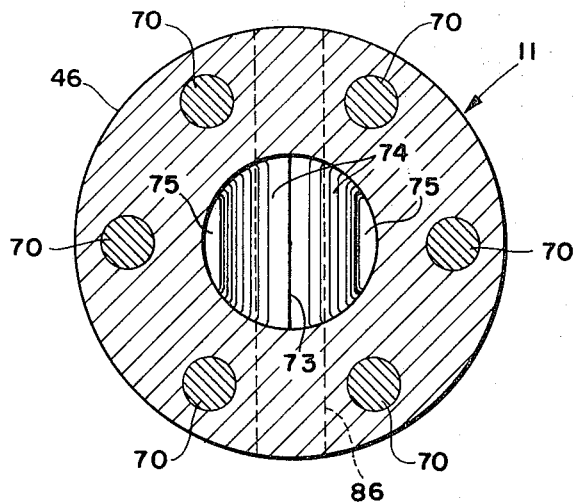
FIGS. 5 and 6 are cross-section views taken along the respective lines 5—5 and 6—6, FIG. 4.
Figure 6:
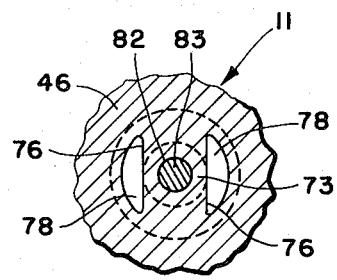

Referring now in detail to the nozzle valve and spreader assembly 11 as shown in FIGS. 4, 5 and 6 the same comprises the cylinder head 46 which is clamped in sealing and heat conducting relation to the lower end of the heating cylinder 31 by means of the screws 70 as shown, said head 46 having a passage 71 in register with the bore 72 of the heating cylinder 31 and having an integral spreader 73 which divides the cylindrical body of plasticized material in passage 71 into two streams of progressively decreasing cross-section area by reason of the diverging relation of the outer surfaces 74 of the spreader 73 with reference to the wall of passage 71. Said diverging surfaces 74 are disposed chordwise as best shown in FIG. 5 to form segmental passages 75 of progressively decreasing chord length. At the middle of the spreader 73 the passage 71 commences to progressively decrease in diameter as shown and likewise the portion of the spreader 73 downstream from the middle has converging chordwise surfaces 76 which define segmental passages 78 which also progressively decrease in cross-section area.

Screwed into the lower end of the head 46 is a nozzle 80 having an orifice 81 which is adapted to register with the mold sprue when the injection assembly 2 is moved downwardly to cause the nozzle 80 to come into sealed contact with the mold 3.

The spreader 73 is formed with a central longitudinal bore 82 in which the valve member 83 is slidably sealed, said valve member 83 defining with the counterbore of the nozzle 80 an annular passage 84 into which the merging streams of plastic material from passages 78 flow through the nozzle orifice 81 when the valve member 83 is moved upwardly away from the seat 85, the seat 85 preferably being in the form of a seat washer which may have say 0.006 inch radial float in the nozzle 80 so that the nozzle orifice need not be perfectly concentric with the bore 82 of the spreader 73. The head 46 is provided with an opening 86 diametrically therethrough and through the spreader 73 into which opening 86 the stem of the valve member 83 extends. Disposed in said opening 86 is a spring 87 which bears on the valve member 83 to yieldably hold the valve member 83 in engagement with the seat 85.

As shown, the diameter of the valve member 83 which is slidably sealed in the bore 82 of the spreader 73 is larger than the diameter of the seat 85 and orifice 81 and, therefore, when the pressure of the plastic material acting on the difference area exceeds the force of the spring 87, the valve member 83 will automatically be moved upwardly away from the seat 85 to permit flow of plastic material through the nozzle orifice 81 into the mold 3, and likewise, when the mold 3 is filled, and when the pressure on the plastic material is decreased to a specified valve, the spring 87 will urge the valve member 83 to seated position. By way of illustrative example, the opening pressure will be about 500 psi when the spring 87 exerts a 11½ lb. force and when the spreader bore 82 diameter 0.213 inch and the seat 85 and orifice 81 diameter is 0.125 inch.

By reason of the relatively small diameter and short length of the nozzle orifice 81, the timer T may be set so that after the mold 3 has been filled, a delay of one or two seconds time before initiating the upward movement of the injection assembly 2 away from the mold 3 will be sufficient to cause a freeze up of the material in the orifice 81 whereby, when the injection assembly 2 does move upwardly, the solidified material in the orifice 81 will remain as an extension of the mold sprue. Hence, during the rotation and retraction of the screw 26 there will be no plastic material in the orifice 81 and the nozzle valve and spreader assembly 11 will be out of heat conducting relation with respect to the mold 3 and therefore the plasticized material will remain in plasticized condition in the head 46 and around the spreader 73 and in the annular passage 84 between the nozzle 80 and valve member 83.

Another distinctive feature of the present invention is that the back pressure resisting upward retraction of the screw 26 while it rotates can be of substantial magnitude that is up to as high as say 500 psi if desired or even greater by use of a stronger valve actuating spring 87 or smaller difference area. Contrary to this, in reciprocating screw type injection molding machines which are not provided with valves, the pressure exerted by the screw on the material in the collecting chamber is limited since higher pressures will cause the plasticized material to leak or drool through the nozzle orifice. Moreover, the valve assembly herein is automatic in its operation whereby once the nozzle 80 comes into contact with the mold 3 with its orifice 81 in register with the mold sprue, the continued downward movement of the screw 26 will cause an increase in pressure on the plasticized material in the collecting chamber 48 and when the pressure exceeds the opening pressure of the valve member 83 as determined by the area difference previously mentioned and the strength of the spring 87, the valve member 83 will be automatically unseated to permit injection of the plasticized material around the spreader 73 and through the annular passage 84 and through the nozzle orifice 81 into the mold 3. By the same token, when the mold 3 has been filled, the high pressure on the plastic material is maintained until the timer T cycle runs out and, at that time, the pressure in the chamber 57 decreases with accompanying decrease in the downward force on screw 26 whereby the spring 87 will be effective to urge the valve member 83 to a position closing the nozzle orifice 81. The slight delay before commencing upward movement of the injection assembly 2 and rotation of the screw 26 will permit solidification of the material in the short length of the nozzle orifice 81 so that the solidified material in effect becomes a short, small diameter extension of the mold sprue to remain as a part of the molded article.

In the event that the valve member 83 becomes sticky in the spreader bore 82 it is a simple matter to unscrew the nozzle 80 and to pull the valve member 83 out for cleaning the bore 82 and the exterior surface of the valve member 83 to renew the sliding seal fit between the valve member 83 and the bore 82.

The embodiments of the invention in which an exclusive property or privilege is claimed are defined as follows:

1. In a reciprocating screw type injection molding machine having a mold and an injection assembly including a heating cylinder having an injection nozzle engageable with said mold, a feed screw rotatable and axially reciprocable in said heating cylinder, and drive means operative to rotate said feed screw in said heating cylinder to deposit material fed thereto and plasticized thereby into a collecting chamber in said heating cylinder as said feed screw is retracted by progressive enlargement of said collecting chamber, and to axially advance said feed screw in said heating cylinder to inject the plasticized material from said collecting chamber through an orifice in said nozzle into said mold, the improvement which comprises a heating cylinder head to which said nozzle is secured and which has an integral spreader operative to subdivide plasticized material into a plurality of streams of progressively decreasing cross-section area during the course of the flow of plasticized material from said collecting chamber to said nozzle; said spreader being hollow and said head having a lateral opening communicating the space within said spreader with the atmosphere; said spreader having a bore leading into such space and disposed coaxially with respect to said orifice; a valve member axially slidably sealed in said bore for movement into and out of engagement with a seat at the upstream end of said orifice; said valve member having an area exposed to pressure of plasticized material upstream of said seat tending to move said valve member out of engagement with said seat; and spring means in said spreader bearing on said valve member to permit yielding movement of said valve member out of engagement with said seat upon predetermined increase in pressure exerted on the plasticized material during axial advance of said feed screw in said heating cylinder; said nozzle having screw threaded engagement with said head; and said seat being at the upstream end of said orifice and having radial float in said nozzle to compensate for eccentricity of the interengaged threads of said nozzle and head.

2. In a reciprocating screw type injection molding machine having a mold and an injection assembly including a heating cylinder having an injection nozzle engageable with said mold, a feed screw rotatable and axially reciprocable in said heating cylinder, and drive means operative to rotate said feed screw in said heating cylinder to deposit material fed thereto and plasticized thereby into a collecting chamber in said heating cylinder as said feed screw is retracted by progressive enlargement of said collecting chamber, and to axially advance said feed screw in said heating cylinder to inject the plasticized material from said collecting chamber through an orifice in said nozzle into said mold, the improvement which comprises a heating cylinder head to which said nozzle is secured and which has an integral spreader operative to subdivide plasticized material into a plurality of streams of progressively decreasing cross-section area during the course of the flow of plasticized material from said collecting chamber to said nozzle; said spreader being hollow and said head having a lateral opening communicating the space within said spreader with the atmosphere; said spreader having a bore leading into such space and disposed coaxially with respect to said orifice; a valve member axially slidably sealed in said bore for movement into and out of engagement with a seat at the upstream end of said orifice; said valve member having an area exposed to pressure of plasticized material upstream of said seat tending to move said valve member out of engagement with said seat; and spring means in said spreader bearing on said valve member to permit yielding movement of said valve member out of engagement with said seat upon predetermined increase in pressure exerted on the plasticized material during axial advance of said feed screw in said heating cylinder; said spreader defining with a circular cross-section passage in said head diametrically opposite passages for flow of plasticized material, said passages being of segmental cross-section shape of progressively decreasing chord widths in a direction from the upstream end of said spreader toward said nozzle.

3. The machine in claim 2 wherein said segmental passages from the points of minimum chord width are yet of segmental cross-section with the arcuate portions being of progressively decreasing diameter so that said passages converge toward each other as the material flows toward said nozzle.

4. A spreader, valve, and nozzle assembly for a reciprocating screw type injection molding machine comprising a cylinder head adapted to be secured at the end of the heating cylinder of such machine and having a passage at one end registering with the bore of said heating cylinder and a nozzle at the other end having an orifice through which plasticized material flows through said passage into a mold engaged by the said nozzle; a spreader integral with said head and defining with said passage two flow passages for transforming a cylindrical body of plasticized material into two segmental streams of progressively decreasing area as the plasticized material flows toward said nozzle; said spreader being hollow and being communicated with the atmosphere via a lateral passage extending through said head between said segmental flow passages; said spreader having a central axial bore which is coaxial with said orifice and which leads into said spreader; a valve member slidably sealed in said bore; said nozzle having a valve seat smaller than said bore; and spring means in said spreader biasing said valve member into engagement with said seat except when the pressure of the plasticized material acting on the differential area of said bore and seat is sufficient to overcome the biasing force of said spring, at which time, said valve member is urged away from said seat for flow of plasticized material through said orifice.

5. The assembly of claim 4 wherein said segmental passages converge to an annular passage defined between said valve member and a surrounding bore of said nozzle upstream of said orifice.

6. The assembly of claim 4 wherein said seat comprises a ring having radial float in said nozzle to accommodate eccentricity of said orifice with respect to said spreader bore.

7. The assembly of claim 4 wherein said nozzle is detachably secured to said head whereby, upon detachment of said nozzle, said valve member may be withdrawn from said spreader bore for conditioning of the spreader bore and exterior surface of said valve member to maintain a smooth sliding seal of said valve member in said spreader bore.

8. The assembly of claim 4 wherein said spreader extends diametrically across said head; and wherein said lateral passage in said head extends diametrically through said head between the surfaces of said spreader which form the chords of said segmental passages.

9. The assembly of claim 4 wherein said spring means comprises a coil spring inserted into said spreader from an end of said lateral passage in said head to a position coaxial with said spreader bore with said valve member having a shoulder engaging one end of said spring so as to be biased thereby into engagement with said seat.

* * * * *